April 23, 1940. C. D. STEPHENS 2,198,588
FISHING REEL ANCHORING MEANS
Filed July 1, 1938 2 Sheets-Sheet 1
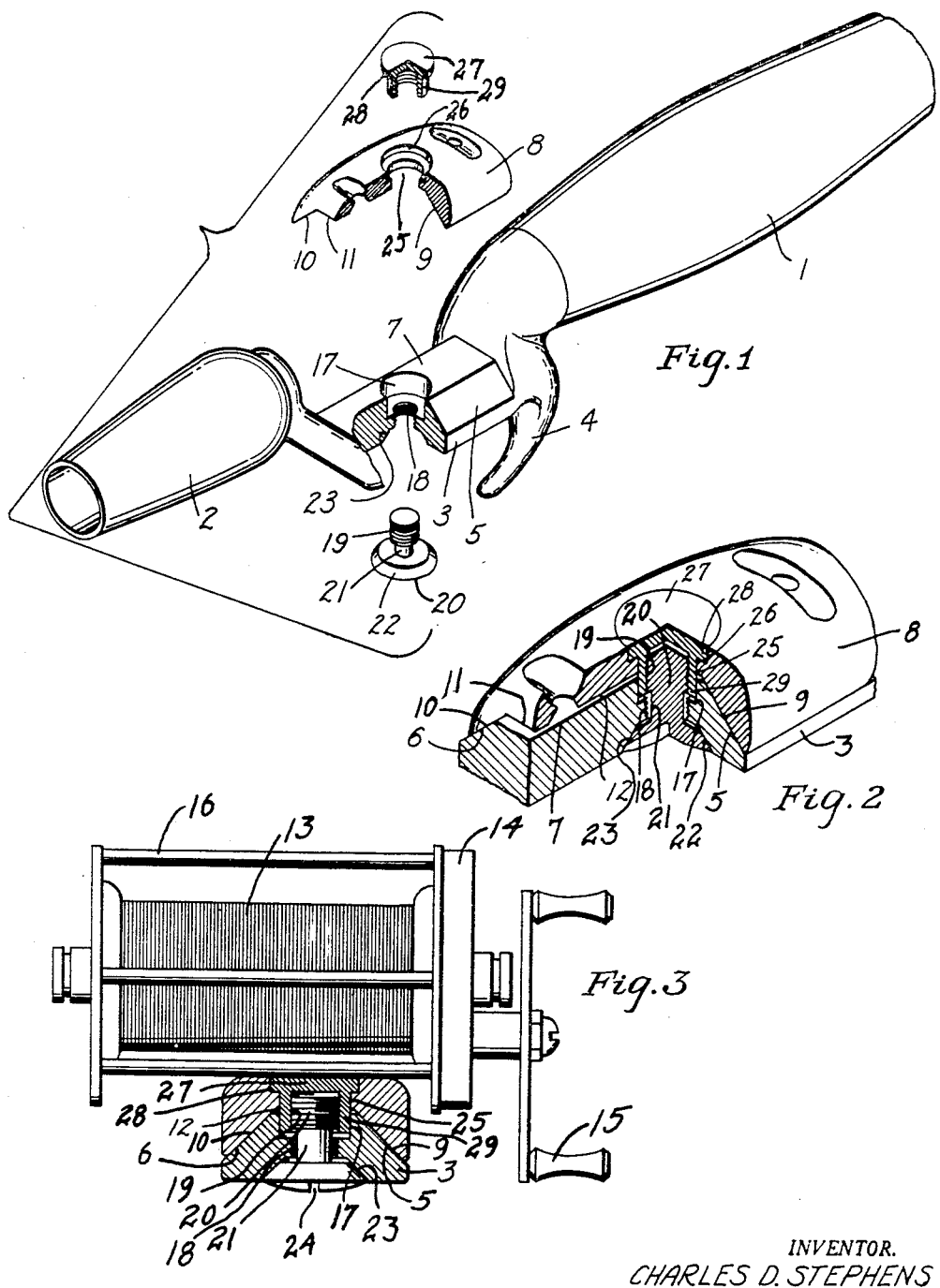
INVENTOR.
CHARLES D. STEPHENS
BY
ATTORNEYS.

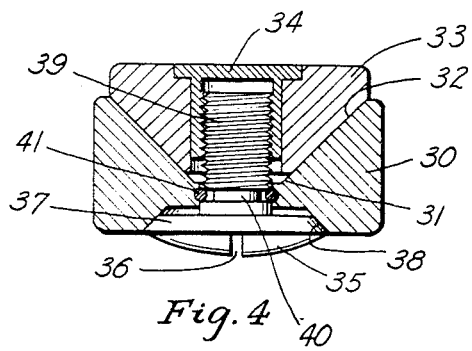
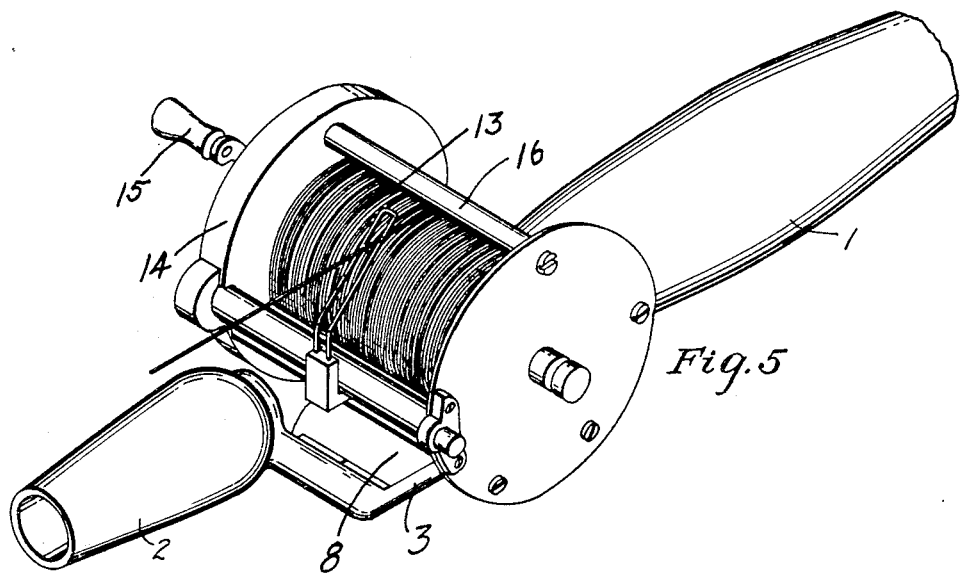

UNITED STATES PATENT OFFICE 2,198,588

FISHING REEL ANCHORING MEANS

Charles D. Stephens, San Antonio, Tex.

Application July 1, 1938, Serial No. 216,923

6 Claims. (Cl. 43—22)

This invention relates to improvements in fishing rods and has for its general object the provision of an improved means of securing a fishing reel to a fishing rod.

In the past the method of securing a fishing reel to a fishing rod was originally to provide the fishing reel with a base portion having a cylindrically concave surface adapted to fit the outer surface of a round rod and handle and to provide means on the rod or handle adapted to engage the ends of this base portion on the reel so as to clamp this base portion of the reel to the outer cylindrical surface of the rod or handle. With this sort of arrangement, frequently difficulty was encountered because of the fact that the means for clamping the reel on the rod or handle would become slightly loosened and the reel would then wobble because it had only a cylindrical seating on the rod or handle. In addition to this, the pull exerted upon the reel was substantially out of line with the rod or handle upon which the reel was mounted, and the reel due to the fact that the said base portion was centered with respect to the spool of the reel and not with respect to the weight of the reel, had a tendency, because of its own weight, to become tilted on the rod or handle.

Heretofore also rods or handles have been made with offset portions for receiving the reel so that the pull exerted by the reel might be placed more nearly in line with the rod upon which the reel is mounted. However, even in such instances, reliance has been placed upon the old form of reel base having the cylindrical surface adapted to be held in contact with a similar surface on the rod handle by some clamping means similar to the clamping means originally provided for securing the reel on a cylindrical handle. No attempt has been made to balance the reel with respect to its base nor has any attempt been made to provide the reel and handle with a means for attaching the two together in such a manner that they cannot readily become loosened from each other, and in such a manner that they will be drawn into tight fitting engagement with each other, where they will be held without the slightest possibility of wobbling with respect to each other.

It is, therefore, an object of this invention to provide an arrangement whereby a reel may be firmly and rigidly secured to a handle without possibility of wobbling with respect to the handle.

It is another object of this invention to provide a reel with a mounting such that when mounted thereon the weight of the reel will be substantially balanced with respect thereto, and the reel will not tend, by virtue of its own unbalanced weight, to tilt or move with respect to its mounting.

Other objects and advantages of this invention will become apparent from the following description taken with the accompanying drawings, it being understood that the same are by way of illustration and example only and are not to be taken as in any wise a limitation upon the scope of this invention. This invention is to be limited in scope only by the prior art and by the terms of the appended claims.

In the drawings:

Fig. 1 is an unassembled view showing the handle of a fishing rod constructed in accordance with this invention, together with a reel base adapted to co-operate therewith and means for securing the reel base to the handle.

Fig. 2 is an enlarged perspective view, parts of which are broken away and shown in section, illustrating the manner of attachment of the reel base to the seat on the handle.

Fig. 3 is a transverse cross section of the structure illustrated in Fig. 2, but having the reel illustrated in place thereon.

Fig. 4 is a view similar to Fig. 3, but showing a slightly modified form of the invention.

Fig. 5 is a perspective view showing a rod handle having a reel attached thereto in accordance with this invention.

Referring now more in detail to the drawings, the handle illustrated in Fig. 1 comprises the two grips 1 and 2 having an offset seating portion 3 therebetween, and having a finger hold 4 disposed in the usual position with respect to the grip 1.

Instead of being formed with a cylinder or portion of a cylindrical seating surface to receive the ordinary reel base, as is the case with the usual handle, the handle constructed in accordance with this invention is provided with two oppositely inclined plane surfaces 5 and 6. These surfaces do not join each other but are terminated short of each other and connected by a third plane surface 7, which makes a substantially equal angle with respect to each of the surfaces 5 and 6.

The reel base 8 which is adapted to co-operate with the seating surfaces just referred to, is provided with complementary inclined surfaces 9 and 10 having the same angle with respect to each other as the surfaces 5 and 6 on the reel seat. These surfaces, however, extend upwardly a slight distance further than the surfaces 5 and 6 so that their nearer edges are closer to each other than are the nearer edges of the surfaces 5 and 6. Joining these surfaces 9 and 10 is another plane surface 11 corresponding to the surface 7 but having slightly less width than the surface 7. Thus, when the reel base is seated upon the reel seat with the surfaces 9 and 10 drawn into close engagement with the corresponding surfaces 5 and 6, the surfaces 7 and 11, will not be in contact with each other but will be slightly spaced apart as shown at 12 in Figs. 2 and 3.

The reel base 8 is secured to the reel by any suitable manner such as by screws or the like, but is not connected to the reel at substantially the center of the spool on the reel as is usually the case. Instead, the reel base is connected to the reel in a position substantially in alignment with the center of gravity of the reel. Inasmuch as all of the gears and the handle of the reel are on one end of the reel, this end of the reel is naturally much heavier than the other. The reel base is therefore mounted much closer to the handle and gear end of the reel than it is to the other end, and is so mounted that it will substantially underlie the center of gravity of the reel when the reel is in horizontal position. This construction is clearly illustrated in Fig. 3 where the spool of the reel is designated by the numeral 13, the gear box by the numeral 14, the handle by the numeral 15, and the frame to which the base is secured by the numeral 16.

Referring again to the co-operation between the reel base and the reel seat, it will be noted that the reel seat is counterbored at 17 from the surface 7 a part of the distance through its thickness and that the remainder of this distance is formed with internal screw threads 18 of a size adapted to receive the screw threads 19 on the holddown screw 20. This holddown screw is provided with a reduced interiorly threaded portion 21 adjacent its head and with a conical seating surface 22 about its head adapted to seat within a corresponding conical countersunk portion 23 at the lower end of the opening through the reel seat. This head 20 is preferably provided with a slot 24 which may be engaged by a coin, screwdriver, or similar instrument, for the purpose of tightening or loosening the screw.

The reel base is provided with an opening 25 therethrough counterbored from its upper end as shown at 26 for a portion of the distance to the surface 11. A nut 27 is seated in this opening and is provided with a lateral flange 28 fitting within the counterbored portion 26, and with an internally threaded sleeve-like portion 29 extending through the remainder of the opening and into the counterbore 17 of the reel seat. This sleeve-like portion 29 is internally threaded to receive the threads 19 on the holddown screw 20.

In use, when it is desired to secure a reel having a reel base such as just described to a reel seat of the type set forth, the holddown screw 20 will be first threaded through the threaded portion of the opening in the reel seat, until the threaded part of this screw passes through this threaded portion and the screw is held loosely within the opening in the reel seat with the part 21 of reduced diameter extending through the threaded portion of the opening in the reel seat. This is the position ordinarily occupied by this holddown screw. It will be seen that when in this position, it will not readily become lost because before it can be loosened the threads which it carries must first be engaged with the threads through the opening in the reel seat and it must then be rotated several revolutions before it can be removed.

With the holddown screw in the position just described, the nut 27 is pressed into place from the upper side of the reel base and the reel base is brought into engagement with the reel seat in the position shown in Fig. 2. The threaded portion of the screw 20 is then engaged with this nut and the screw rotated until tight. The tightening of this screw tends to draw the oppositely inclined surfaces 9 and 10 tightly against the oppositely inclined surfaces 5 and 6 to positively and immovably fix the reel base with respect to the reel seat and hence to positively and immovably fix the reel with respect to the rod handle and rod.

It will be appreciated that by virtue of the conical seating of the screw 20 within the reel seat, this screw is allowed to move laterally in one direction or another as it is being tightened so that the mating surfaces 5, 6, 9 and 10 may firmly and flatly engage each other. At the same time, when the screw 20 is tightened, it will serve by virtue of its conical seating within the reel seat to prevent any longitudinal movement of the reel on the handle. It will thus be appreciated that for any direction in which a stress may be placed upon the reel tending to move it with respect to the handle, there will be two flat surfaces in engagement with each other to prevent such movement. Furthermore, these flat surfaces are so arranged that they oppose each other and when the connection is drawn tight the parts are firmly wedged with respect to each other and prevented from any movement with respect to each other. The movement which is prevented is not only a tilting movement upon the handle itself, and a longitudinal endwise movement of the reel upon the handle, but also any tendency due to the winding of the reel crank to twist the reel with respect to the handle is positively prevented because of the flat oppositely inclined surfaces in engagement with each other.

Although the screw 20 is so formed and mounted that it will not readily become loose and although the nut 27 is pressed into place, either or both of these elements can readily be removed whenever desired for repair and replacement.

It is worthy of note in connection with the structure just described that because the surfaces 7 and 11 do not come in contact with each other, there is no limit to the tightness and firmness with which the reel base may be secured to the reel seat. On the other hand, the tighter the screw 20 is turned, the more firmly will the oppositely inclined surfaces 5, 6, 9 and 10 be held against each other and the more positive will be the engagement between the reel base and the reel seat.

Referring now to Fig. 4, it will be seen that the parts here shown are substantially the reverse of those shown in Figs. 1 to 3, inclusive. That is to say, the handle 30 is provided with a hollowed out portion having inwardly inclined walls 31 adapted to receive the outwardly inclined walls 32 on the reel base 33. The action is substantially the same as in the previously described structure, but the relation of the respective parts is reversed. As in the previously described structure, the nut 34 is provided in all respects similar to the nut 27 and it is seated in the reel base 33 in substantially the same manner. Likewise, a screw 35 is provided with a slot 36 and with a tapered head 37 seating against a tapered seat 38 within the rod handle for the purpose of engaging the nut 34. Between the threads 39 on this screw and the head thereof, however, there is a portion 40, of reduced diameter adapted to engage a ring 41 slipped into place within the reel seat 30 for holding the screw therein and preventing its loosening.

From the foregoing it will be seen that a means has been devised whereby all of the objects and advantages sought by this invention may readily and efficiently be accomplished. The reel will be firmly secured upon the rod handle in a manner which will prevent it from wobbling, tilting or twisting with respect to its handle, and the reel will be so mounted that it will be less apt to be dislodged by the force of gravity acting upon the unbalanced seat and will be less apt to be dislodged by the stresses exerted upon the reel crank in winding the reel.

Having described my invention, I claim:

1. In combination, a reel seat and a reel base, one of said parts having separate and distinct oppositely inclined seating surfaces and the other of said parts having separate surfaces oppositely inclined to the same degree and adapted to seat against said first named surfaces, and means for drawing said oppositely inclined surfaces respectively into tight engagement with each other.

2. In combination, a reel base having an opening therethrough, and a hollow nut removably seated in said opening from the upper side thereof, and adapted to threadedly receive a means for securing the reel base to a reel seat.

3. A reel seat having oppositely inclined seating surfaces thereon and an opening therethrough, said opening being threaded a portion of the distance therethrough and counterbored the remainder of said distance to a diameter greater than the diameter of said threads, and a holddown screw having a threaded portion adapted to threadedly engage the threads in said opening and a portion of reduced diameter between said threaded portion and its head, said portion of reduced diameter being of greater length than the threaded portion of said opening.

4. A reel seat having oppositely inclined seating surfaces and an opening therethrough, a screw adapted to loosely pass through said opening, said opening having a tapered countersink at one end and a head having a tapered seating surface on said screw adapted to engage said tapered countersink when said screw is tightened.

5. In combination, a reel seat, a reel base, said parts each having oppositely inclined surfaces thereon adapted respectively to co-operate with each other when said reel base is seated upon said reel seat, said parts being so proportioned that said reel base and reel seat will be spaced apart between said inclined surfaces when said inclined surfaces are in tight engagement with each other.

6. In combination, a reel base and a reel seat, interengaging complementally formed seating surfaces on said parts respectively adapted when said surfaces are firmly seated together to prevent any lateral movement of said parts with respect to each other, and means passing through one of said parts and engaging the other of said parts to draw said parts together until said surfaces are in firmly seated engagement with each other.

CHARLES D. STEPHENS.